(12) United States Patent
Rue (10) Patent No.: US 11,945,039 B2
(45) Date of Patent: Apr. 2, 2024

(54) ROUND CUTTING INSERT FOR A MILLING TOOL

(71) Applicant: AB SANDVIK COROMANT, Sandviken (SE)

(72) Inventor: Marc Rue, Charentilly (FR)

(73) Assignee: AB Sandvik Coromant, Sandviken (SE)

( * ) Notice: Subject to any disclaimer, the term of this patent is extended or adjusted under 35 U.S.C. 154(b) by 452 days.

(21) Appl. No.: 17/426,300

(22) PCT Filed: Sep. 12, 2019

(86) PCT No.: PCT/EP2019/074356
§ 371 (c)(1),
(2) Date: Jul. 28, 2021

(87) PCT Pub. No.: WO2020/156691
PCT Pub. Date: Aug. 6, 2020

(65) Prior Publication Data
US 2022/0105578 A1    Apr. 7, 2022

(30) Foreign Application Priority Data
Jan. 31, 2019   (EP) ..................................... 19154672

(51) Int. Cl.
*B23C 5/06* (2006.01)
*B23C 5/22* (2006.01)

(52) U.S. Cl.
CPC ...... *B23C 5/2213* (2013.01); *B23C 2200/045* (2013.01); *B23C 2200/128* (2013.01); *B23C 2200/162* (2013.01)

(58) Field of Classification Search
CPC ............ B23C 5/2213; B23C 2200/045; B23C 2200/085; B23C 2200/128;
(Continued)

(56) References Cited

U.S. PATENT DOCUMENTS 5,346,336 A  *  9/1994  Rescigno ............ B23B 27/1622
                                                                 407/104
6,152,658 A  *  11/2000  Satran ................. B23B 27/1614
                                                                 407/120
(Continued)

FOREIGN PATENT DOCUMENTS

DE      102016217533 A1    3/2017
EP           1013365 A1    6/2000
(Continued)

*Primary Examiner* — Sara Addisu
(74) *Attorney, Agent, or Firm* — Corinne R. Gorski (57) ABSTRACT

A round cutting insert for a milling tool having a center axis and a neutral plane extending perpendicularly thereto. The round cutting insert includes a circumferential side surface surrounding the center axis between upper and lower round main surfaces. An upper cutting edge is formed along the intersection of the upper round main surface and the side surface. A plurality of elongated support grooves are arranged in the side surface. Each elongated support groove has a bottom surface extending in a lengthwise direction with opposite flank surfaces converging toward the bottom surface and extending in parallel with the lengthwise direction of the elongated support groove. The lengthwise direction of each elongated support groove forms an acute angle with the neutral plane as seen in a side view. At least one of the opposite flank surfaces of each elongated support groove is configured as a side support surface.

15 Claims, 5 Drawing Sheets

(58) Field of Classification Search
CPC . B23C 2210/168; B23C 5/2208; B23C 5/006; B23C 2200/162; B23C 5/06
See application file for complete search history.

(56) References Cited

U.S. PATENT DOCUMENTS

| | | | | |
|---|---|---|---|---|
| 6,164,878 | A * | 12/2000 | Satran | B23C 5/2213 407/103 |
| 6,238,133 | B1 * | 5/2001 | DeRoche | B23C 5/2213 407/34 |
| 6,607,334 | B2 * | 8/2003 | Satran | B23C 5/2213 407/113 |
| 6,966,729 | B2 * | 11/2005 | Dehn | B23C 5/22 407/116 |
| 7,255,518 | B2 * | 8/2007 | Wallstrom | B23C 5/2208 407/103 |
| 7,591,614 | B2 * | 9/2009 | Craig | B23C 5/109 407/66 |
| 8,496,415 | B2 * | 7/2013 | Zitzlaff | B23B 27/145 407/113 |
| 9,095,909 | B2 * | 8/2015 | Scandroglio | B23C 5/2213 |
| 9,144,848 | B2 * | 9/2015 | Konta | B23C 5/109 |
| 9,289,834 | B2 * | 3/2016 | Park | B23C 5/2213 |
| 9,550,239 | B2 * | 1/2017 | Yamamoto | B23C 5/202 |
| 9,782,831 | B2 * | 10/2017 | Lenischenko | B23B 27/22 |
| 10,112,241 | B2 * | 10/2018 | Lee | B23C 5/202 |
| 10,350,686 | B2 * | 7/2019 | Oprasic | B23C 5/202 |
| 10,434,583 | B2 * | 10/2019 | Kister | B23C 5/24 |
| 10,646,927 | B2 * | 5/2020 | Hecht | B23B 27/1685 |
| 11,806,796 | B2 * | 11/2023 | Fang | B23C 5/06 |
| 2002/0168235 | A1 * | 11/2002 | Johnson | B23C 5/006 407/43 |
| 2003/0059262 | A1 * | 3/2003 | Men | B23C 5/2213 407/35 |
| 2006/0275088 | A1 * | 12/2006 | Lehto | B23C 5/2213 407/113 |
| 2007/0183857 | A1 * | 8/2007 | Wihlborg | B23C 5/2204 407/67 |
| 2010/0054873 | A1 * | 3/2010 | Men | B23C 5/2213 407/42 |
| 2012/0301235 | A1 | 11/2012 | Yoshioka et al. | |
| 2013/0156515 | A1 * | 6/2013 | Satran | B23C 5/202 407/113 |
| 2013/0336732 | A1 * | 12/2013 | Jansson | B23C 5/06 407/113 |
| 2014/0010608 | A1 | 1/2014 | Lenischenko | |
| 2014/0072377 | A1 * | 3/2014 | Sunnvius | B23C 5/06 407/42 |
| 2018/0147642 | A1 * | 5/2018 | Takahashi | B23C 5/06 |
| 2019/0344363 | A1 * | 11/2019 | Bonhoure | B23C 5/2213 |
| 2022/0288706 | A1 * | 9/2022 | Shikama | B23C 5/2213 |

FOREIGN PATENT DOCUMENTS

| | | | | |
|---|---|---|---|---|
| GB | 1296206 | A | 11/1972 | |
| JP | 11245105 | A * | 9/1999 | B23C 5/109 |
| JP | 2001079708 | A * | 3/2001 | B23C 5/109 |
| JP | 2015024458 | A | 2/2015 | |
| WO | 2010134700 | A2 | 11/2010 | |
| WO | 2015159897 | A1 | 10/2015 | |

* cited by examiner

ROUND CUTTING INSERT FOR A MILLING TOOL

RELATED APPLICATION DATA

This application is a § 371 National Stage Application of PCT International Application No. PCT/EP2019/074356 filed Sep. 12, 2019 with priority to EP 19154672.0 filed Jan. 31, 2019.

TECHNICAL FIELD OF THE INVENTION

The invention relates to a round cutting insert, a milling tool body for the round cutting insert and a milling tool for chip-removing machining including the round cutting insert.

BACKGROUND OF THE INVENTION AND PRIOR ART

The invention is related to the problem of providing a stable support for a round cutting insert in a milling tool. There are numerous known solutions aimed at providing such stable support as well as rotation prevention of round cutting inserts mounted in seats of milling tools.

WO2010/134700 discloses a double-sided cutting insert having a circular shape (round cutting insert), which is configured to be safely mounted in a milling tool. The round cutting insert hereby comprises a cylindrical side surface having a plurality of rotation prevention surfaces. The rotation prevention surfaces are formed perpendicularly to the round top and bottom surfaces and are recessed toward an inside of the side surface, whereby the round indexable cutting insert is safely mounted in the milling tool by providing a relatively large area on the rotation prevention surfaces.

US2012301235 discloses another solution comprising a cutting insert having a curved side surface provided with engagement grooves having v-shaped, rectangular or semi-circular cross-sectional shapes. A seat is provided with a corresponding engagement projection for contacting the engagement groove to improve the seating stability of the cutting insert. The engagement grooves of the cutting insert are in this case extending in parallel with the top and bottom surfaces of the cutting insert.

However, the stability in the support of the round cutting insert can be further improved and, in addition, the number of possible index positions of the round cutting insert can also be further increased, which in turn increases the service life and versatility of the round cutting insert for use in different milling applications at various cutting depths.

SUMMARY OF THE INVENTION

The object of the present invention is that of providing a round cutting insert exhibiting an improved stability in the support and rotation prevention when the round cutting insert is mounted in a seat of a milling tool, while also enabling an increased number of index positions on the round cutting insert.

Accordingly, the round cutting insert of the present invention has an insert centre axis and a neutral plane extending perpendicularly to the insert centre axis, wherein the round cutting insert includes an upper round main surface defining an upper reference plane and a lower round main surface defining a lower reference plane, which are equidistantly separated from the neutral plane. The round cutting insert includes a circumferential side surface surrounding the insert centre axis and extending between the upper and lower round main surfaces, wherein an upper cutting edge is formed along the intersection of the upper round main surface and the circumferential side surface. The round cutting insert includes a plurality of elongated support grooves arranged in the circumferential side surface, wherein each elongated support groove has a bottom surface extending in a lengthwise direction with opposite flank surfaces converging toward the bottom surface and extending in parallel with the lengthwise direction of each elongated support groove.

The round cutting insert of the present invention is characterized in that the lengthwise direction of each elongated support groove is forming an acute angle $\theta$ with the neutral plane as seen in a side view of the round cutting insert, and at least one of the opposite flank surfaces of each elongated support groove is configured as a side support surface for the round cutting insert.

In this way, an increased surface area on the flank surface/side support surface of each elongated support groove is achieved by inclining the lengthwise direction of each elongated support groove at the acute angle $\theta$ in relation to the neutral plane. Hence, the acute angle $\theta$ provides elongated support grooves (lengthwise directions) extending diagonally across the neutral plane, which increases the stability by enabling larger/longer side support surfaces in the lengthwise directions compared to side support surfaces extending in parallel or perpendicularly to the neutral plane.

Moreover, cutting forces will tend to turn the round cutting insert in a specific direction around the insert centre axis, clockwise or counter-clockwise in the seat, depending on the milling tool being a right- or left-hand milling tool. The acute angle $\theta$ hereby enables the provision of a specific inclination direction (positive or negative to the neutral plane), wherein the side support surfaces being oriented at the acute angle $\theta$ ($\pm$) can effectively counteract the specific rotational direction (clockwise or counter-clockwise) caused by the cutting forces. In other words, the cutting forces will thereby merely press the relatively large side support surface of the round cutting insert into tighter abutment with a side contact surface of the seat, which further enhances the stability and rotation prevention of the round cutting insert in the seat of the milling tool. The specific inclination direction (positive or negative) on the acute angle $\theta$ of the lengthwise direction aimed at improving the stability/anti-rotation depends on whether an upper or lower flank surface is configured as side support surface in the elongated support groove. This is further described below in an embodiment wherein a lower flank surface of each elongated support groove is configured as the side support surface of the round cutting insert.

Additionally, an increased number of elongated support grooves having relatively large/long side support surfaces can be arranged around the circumferential side surface of the round cutting insert, whereby the number of index positions of the round cutting insert can be increased. In other words, elongated support grooves/side support surfaces having a given size/length can be spaced closer together if they are inclined at the acute angle $\theta$ compared to elongated support grooves/side support surfaces extending in parallel with the neutral plane.

In an embodiment of the round cutting insert, at least a lower flank surface, in relation to the upper reference plane, is configured as the side support surface in each elongated support groove. In this way, a side contact surface of a seat presses against the lower flank surface configured as side support surface of the cutting insert to provide a so called dovetail clamping action in the support of the cutting insert. In other words, it provides a clamping force component directed downwards toward a bottom contact surface of the seat to provide a more stable fixation and rotation prevention of the cutting insert in the seat compared to using an upper flank surface as side support surface for the round cutting insert.

In a further embodiment of the round cutting insert, the lengthwise direction is forming a positive acute angle θ with the neutral plane in a side view of a round cutting insert configured for a right hand milling tool. In this way, the lower side support surfaces of the elongated support grooves oriented at the positive acute angle +θ with the neutral plane effectively counteract a clockwise rotational direction on the cutting insert caused by the cutting forces that arise in the right-hand milling tool. Accordingly, the tendency to turn the round cutting insert around the insert centre axis caused by the cutting forces is counteracted as the lower side support surfaces press into tighter abutment with the side contact surfaces of the seat, which further enhances the stability and rotation prevention of the round cutting insert in a right-hand milling tool. Or vice versa, the lengthwise direction is forming a negative acute angle −θ with the neutral plane in a side view of a round cutting insert configured for a left hand milling tool. Hence, in a cutting insert configured for a left-hand milling tool, the lengthwise direction on the lower side support surfaces of the elongated support grooves oriented at negative acute angles −θ effectively counteract a counter-clockwise rotational direction caused by cutting forces that arise in a left-hand milling tool. The cutting forces thereby presses the lower side support surfaces tighter against the side contact surfaces of the seat, which enhances the stability and rotation prevention of the round cutting insert in a left-hand milling tool. It is hereby emphasized that if the upper (instead of the lower) flank surface of each elongated support groove is configured as a side support surface, the opposite relationship on the inclination direction should be used in view of the milling tool being a right- or left-hand milling tool. Hence, for a right-hand milling tool using an upper side support surface, the acute angle θ should be negative, whereas for a left-hand milling tool using an upper side support surface, the acute angle θ should be positive.

In an embodiment of the round cutting insert, the lengthwise direction (of each elongated support groove/bottom surface) is forming an acute angle θ having an absolute value in the range $10°≤θ≤45°$, preferably $15°≤θ≤30°$ and more preferably $15°≤θ≤25°$, with the neutral plane of the round cutting insert. Hence, the lengthwise direction of the elongated support grooves is oriented diagonally across the neutral plane within this range to optimize the increased length extension/rotation prevention and the number of index positions. An acute angle θ equal to or above 10° provides notably larger/longer side support surfaces with improved rotation prevention as well as more index positions compared to elongated support grooves oriented in parallel (θ=0°) with the neutral plane. However, an acute angle θ above 45° means that the elongated support groove is mainly extending in a vertical (or thickness) direction of the round cutting insert, which will lead to a reduced size/shortened length on the side support surfaces (elongated support grooves), because the available space in the vertical (thickness) direction of the round cutting insert is less than the available space in the horizontal/circumferential direction (θ≤45°). This is further optimized when the absolute value on the acute angle θ on the lengthwise direction is in the range $15°≤θ≤30°$ and more preferably $15°≤θ≤25°$ in view of achieving both an increased size/length/improved rotation prevention and many index positions.

In yet a further embodiment of the round cutting insert, the side support surface is planar. Stability is enhanced by such planar (flat) side support surfaces in the elongated support grooves, since it facilitates a manufacturing and control of a precise side support on the cutting insert. The planar support surface also facilitates a grinding operation on the support surfaces for improved precision/stability in the support.

In another embodiment of the round cutting insert, the lower flank surface configured as the side support surface is forming an acute inner angle β with the lower reference plane as seen in cross-sections parallel with the insert centre axis. Accordingly, the side support surface is inclined in relation to the lower reference plane at a defined acute inner angle β at which the dovetail clamping/side support of the insert is accomplished. In this way, the manufacturing and control of a precise side support is facilitated, since the angle at which the side support surface is inclined is the same along the length extension/direction of the elongated support groove/side support surface. Although the side support surfaces may be shaped for instance convex or concave, wherein the acute inner angle is formed by a chord between end points of such convex/concave shape in said cross-section, this embodiment is preferably combined with the previous embodiment including planar support surfaces, whereby manufacturing and control of the side support is further facilitated. Hence, planar side support surfaces inclined at the defined acute inner angle β in relation to a lower reference plane is easily manufactured/controlled and facilitates a flat grinding operation of the side support surfaces for improved precision/stability in the support.

In a further embodiment of the round cutting insert, the lower flank surface configured as the side support surface is forming an acute inner angle β in the range $65°≤β≤85°$, preferably $70°≤β≤80°$, with the lower reference plane. In this range, the acute inner angle β is of such size to ensure both adequate dovetail clamping action and bulk strength of the round cutting insert. Hence, providing acute inner angles β below 65° jeopardizes the bulk strength of the cutting insert, since the side support surfaces run rather steeply into the circumferential side surface, whereby the round cutting insert becomes weaker and may fracture due to the cutting forces acting on it during milling. However, acute inner angles β above 85° barely provides any dovetail clamping action with a correspondingly inclined side contact surface in the seat. An optimum on the acute inner angle β, in a compromise between achieving a sufficient bulk strength and a dovetail clamping action, may be found in the range $70°≤β≤80°$ with the lower reference plane.

In a further embodiment, the round cutting insert is a double-sided cutting insert including a lower cutting edge formed along the intersection of the lower round main surface and the circumferential side surface, wherein the opposite flank surfaces of each elongated support groove form identical side support surfaces. The double-sided cutting insert can be reversed, so that the lower round main surface with its cutting edge(s) can be used for an active cutting operation, wherein the number of indexable cutting edges are doubled in relation to a single-sided cutting insert. In this way, one of the opposite flank surfaces (lower or upper) forming identical side support surfaces can alternately be used if one (upper) or the other (lower) round main surface is used for an active cutting operation.

In a further embodiment of the round cutting insert, each elongated support groove is v-shaped as seen in cross-sections parallel with the insert centre axis. In this way, a lateral surface extension (perpendicular to the lengthwise extension/direction) of each side support surface is maximized, since the bottom surface is merely forming a minimal transition surface between the oppositely converging (v-shaped) side support surfaces of each elongated support groove. Hence, stability is enhanced by providing such large size/extension on the side support surfaces in the lateral direction (perpendicular to the lengthwise direction).

In a further embodiment of the round cutting insert, the circumferential side surface comprises upper and lower clearance surfaces adjacent to the upper and lower cutting edges, wherein the upper and lower clearance surfaces form positive clearance angles at the upper and lower cutting edges. The positive clearance angle increases the clearance to the workpiece surface, so that the double-sided round cutting insert need not be mounted at such negative radial/axial tipping-in angles as a double-sided round cutting insert of negative type (0° clearance angle on the clearance surfaces/circumferential side surface). Enhanced chip evacuation, cutting performance and ramping capabilities can hereby be achieved compared to a double-sided cutting insert of the negative type.

In another embodiment of the round cutting insert, identical elongated support grooves are arranged in a side-by-side manner around the entire circumferential side surface and the number of elongated support grooves is at least six or greater, such as for instance eight elongated support grooves being arranged in the side-by-side manner around the entire circumferential side surface. Accordingly, the identical elongated support grooves are closely arranged adjacent to each other (in side-by-side manner) around the entire circumferential side surface, which may evidently be provided with small transition surfaces between adjacent elongated support grooves. In this way the entire circumference is formed by successively arranged elongated support grooves giving a high number on index positions and large sized (long) side support surfaces on the round cutting insert. Furthermore, when the oppositely converging flank surfaces of each elongated support groove form identical side support surfaces, such as v-shaped elongated support grooves, that are arranged in such a side-by-side manner around the entire circumferential side surface, these will create a waist section on the double-sided round cutting insert. Such a waist section additionally increases the clearance between the workpiece and the circumferential side surface on the mounted double-sided round cutting insert. This is beneficial, since the double-sided round cutting insert thereby need not be mounted at as negative radial/axial tipping-in angles in the seat as a double-sided round cutting insert of the negative type.

Accordingly, the milling tool body, which is rotatable around a central rotation axis, includes a seat configured for the round cutting insert as defined above. The seat comprises a seat centre axis and a round bottom contact surface for supporting the lower round main surface of the round cutting insert, the round bottom contact surface defining a lower reference plane extending perpendicularly to the seat centre axis, wherein the seat comprises at least one side contact surface for supporting the side support surface of the round cutting insert, wherein the side contact surface is extending in a lengthwise direction to form a corresponding acute angle θ2 with the lower reference plane as seen in a side view of the seat. The advantages of improved stability, rotation prevention and enablement of more index positions are the same as previously mentioned in connection with the round cutting insert above.

In an embodiment of the milling tool body, the side contact surface is forming a corresponding acute inner angle $\beta_2$ with the lower reference plane of the seat as seen in cross-sections parallel with the seat centre axis. In this way the side contact surface provides the dovetail clamping action as previously mentioned in connection with the round cutting insert. Additionally, it facilitates the manufacturing and control of a precise side contact surface, since it's extending at a single defined acute inner angle $\beta_2$ with the lower reference plane of the seat.

In a further embodiment of the milling tool body, the seat comprises two side contact surfaces for supporting two side support surfaces of two elongated support grooves on the round cutting insert, wherein a first side contact surface is arranged as an axial support surface in the seat and a second side contact surface is arranged as a radial support surface in the seat. In this way the first side contact surface is dedicated/oriented to support axial cutting forces that arise in a milling operation, wherein the second contact surface is dedicated/oriented to support radial cutting forces that arise in the milling operation. In other words, the first side contact surface is arranged in the seat so that the lengthwise direction is oriented transverse to the central rotation axis of the milling tool body in order to carry the axial cutting forces, wherein second contact surface is arranged in the seat so that the lengthwise direction is oriented along the central rotation axis of the milling tool body to carry the radial cutting forces that arise during milling.

The object of the invention is furthermore achieved by a milling tool comprising a milling tool body and the round cutting insert as defined above.

BRIEF DESCRIPTION OF THE DRAWINGS

Embodiments are described with references to the drawings, in which:

FIG. 8-8*c* show a perspective and detailed views of the milling tool body and the round cutting insert including a cross-section taken along the neutral plane of the round cutting insert,

DETAILED DESCRIPTION OF EMBODIMENTS OF THE INVENTION

Figures 1, 2, 3, 4:
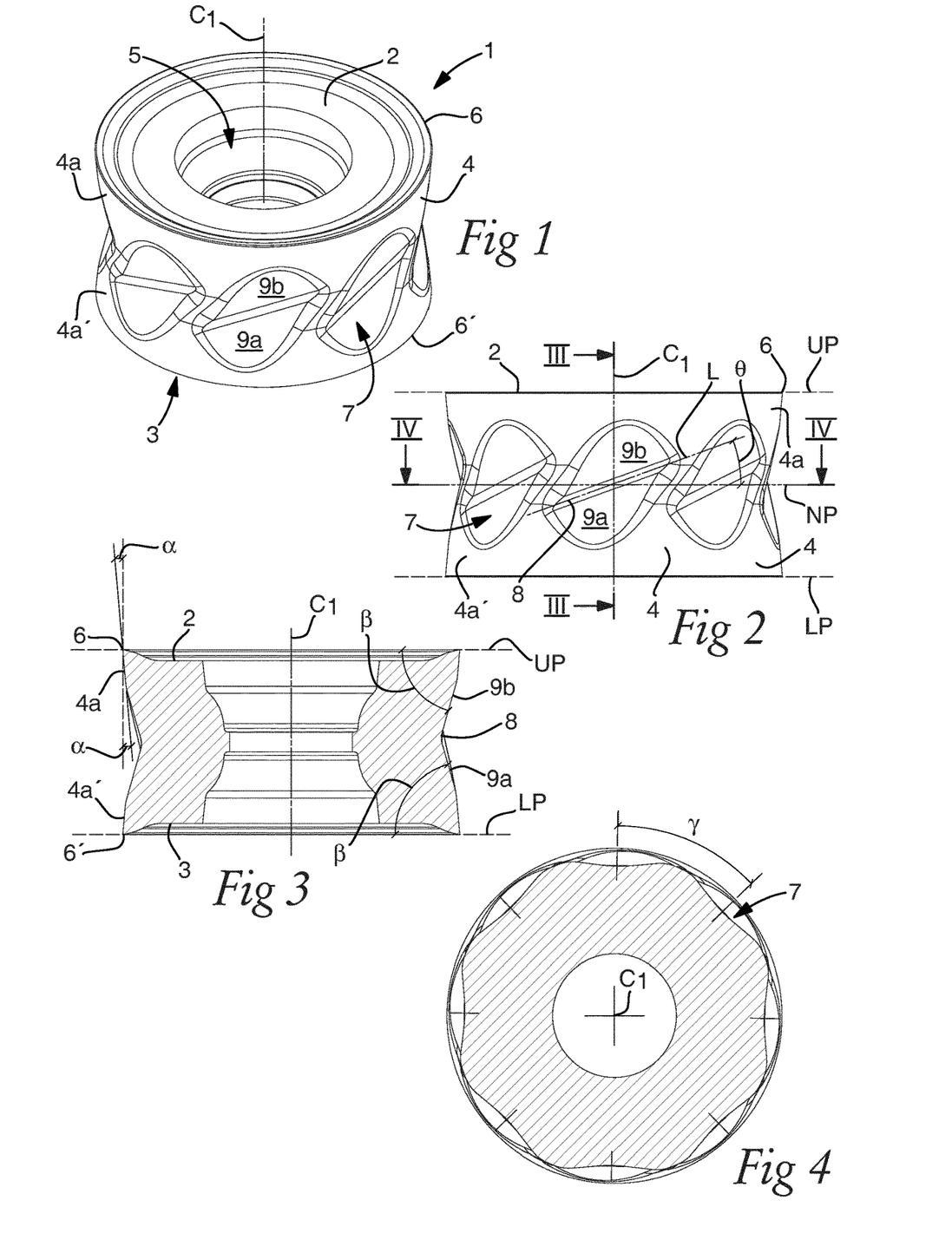
FIG. 1 shows a perspective view of a round cutting insert according to an embodiment of the invention.
FIG. 2 shows a side view of the round cutting insert in FIG. 1.
FIG. 3 shows a cross-section III-III of the round cutting insert in FIG. 2.
FIG. 4 shows a cross-section IV-IV of the round cutting insert in FIG. 2, FIGS. 5*a*-5*c* show a perspective view, a side view and a front view of a milling tool according to an embodiment of the invention.

FIGS. 1-2 discloses a perspective view and a side view respectively of a round cutting insert 1 for a milling tool according to an embodiment of the invention. The round cutting insert 1 has an insert centre axis $C_1$ and a neutral plane NP extending perpendicularly to the insert centre axis $C_1$. The round cutting insert 1 includes an upper round main surface 2 defining an upper reference plane UP and a lower round main surface 3 defining a lower reference plane LP, which are equidistantly separated from the neutral plane NP. A circumferential side surface 4 of the round cutting insert 1 surrounds the insert centre axis $C_1$ and extends between the upper and lower round main surfaces 2, 3. The insert centre axis $C_1$ is furthermore defining the centre of a through-hole 5 for mounting the round cutting insert by means of a screw. An upper cutting edge 6 is formed along the intersection of the upper round main surface 2 and the circumferential side surface 4. The round cutting insert 1 is a double-sided round cutting insert 1, wherein the lower round main surface 3 is identical to the upper round main surface 2. The double-sided round cutting insert 1 furthermore includes a lower cutting edge 6' formed along the intersection of the lower round main surface 3 and the circumferential side surface 4.

The double-sided round cutting insert includes a plurality of elongated support grooves 7 arranged in the circumferential side surface 4. Each elongated support groove 7 has a bottom surface 8 extending in a lengthwise direction L with opposite flank surfaces 9a, 9b converging toward the bottom surface 8 and extending in parallel with the lengthwise direction L of the elongated support groove 7/bottom surface 8. As can be seen in FIG. 2 the lengthwise direction L of each elongated support groove 7 is forming an acute angle θ with the neutral plane NP as seen in a side view of the round cutting insert.

Furthermore, one of the opposite flank surfaces 9a, 9b of each elongated support groove 7 is configured or intended to be used as a side support surface 9a for the round cutting insert. More precisely, a lower flank surface 9a, in relation to the upper reference plane UP, is configured or intended to be used as the side support surface in each elongated support groove 7 when the upper round main surface 2 with its upper cutting edge 6 is used for an active cutting operation. However, the shown double-sided cutting insert can also be reversed so that the lower round main surface 3 is turned upwards for an active cutting operation using the lower cutting edge 6'. The opposite flank surfaces 9a, 9b of each elongated support groove 7 hereby form identical side support surfaces 9a, 9b, whereby the shown upper flank surface 9b can be used as side support surface 9b when the double-sided cutting insert is reversed and the lower round main surface 3 with the lower cutting edge 6' is turned upwards for an active cutting operation.

The double-sided round cutting insert shown in FIGS. 1-4 is configured for a right-hand milling tool (see also FIGS. 5a-5c), wherein the lengthwise direction L (in the direction from left to right) is forming a positive acute angle θ with the neutral plane NP as seen in a side view of the round cutting insert. In other words, a cartesian coordinate system is formed by the neutral plane NP representing an x-axis with the insert centre axis C1 representing a y-axis, wherein positive acute angles θ designates rotations of the lengthwise direction L in an anticlockwise direction and negative acute angles −θ designates rotations of the lengthwise direction L in a clockwise direction in said side view of the round cutting insert. The shown round cutting insert for a right hand milling tool can hereby be modified for use in a left hand milling tool (i.e. a milling tool exhibiting the opposite rotational direction R compared to the one shown in FIGS. 5a-5c) by simply reversing the lengthwise direction L to form a negative acute angle −θ with the neutral plane NP as seen in said side view of the round cutting insert. The lengthwise direction L may hereby form an acute angle θ having an absolute value in the range 10°≤θ≤45°, preferably 15°≤θ≤30° and more preferably 15°≤θ≤25°. In the shown embodiment, the lengthwise direction L is forming a positive acute angle θ=20° with the neutral plane NP.

The side support surfaces 9a, 9b are planar. Hence, the side support surfaces 9a, 9b, which are converging toward the bottom surface 8, have a flat surface extension in both the lengthwise direction and its (thereto perpendicular) lateral direction.

Moreover, as can be seen in FIG. 3, the elongated support groove 7 is v-shaped as seen in the cross-section (and in cross-sections parallel with the insert centre axis). Hence, the bottom surface 8 of each elongated support groove is forming a rather small transition surface between the converging v-shaped flank surfaces/side support surfaces 9a, 9b.

Furthermore, the lower flank surface/side support surface 9a is forming an acute inner angle β with the lower reference plane LP as seen in a cross-section along the insert centre axis $C_1$. The same acute inner angle β between the side support surface 9a and the lower reference plane LP is formed in several cross-sections parallel with the insert centre axis $C_1$ as the side support surface 9a is planar and the lengthwise direction L of each elongated support groove 7 (or bottom surface 8) is extending perpendicularly to a radius of the round cutting insert (see also FIG. 4). The lower side support surface 9a may hereby form an acute inner angle β in the range 65°≤β≤85°, preferably 70°≤β≤80°, with the lower reference plane LP as seen in cross-sections parallel with the insert centre axis $C_1$. In the shown embodiment the acute inner angle β=74°. Furthermore, the upper flank surface/side support surface 9b is forming the same acute inner angle β with the upper reference plane UP, since the double-sided round cutting insert 1 is provided with identical side support surfaces 9a, 9b. As can be seen in FIG. 2, the neutral plane NP is intersecting the bottom surface 8 at a centre of each elongated support groove 7 on the double-sided round cutting insert 1. The identical side support surfaces 9a, 9b hereby exhibit a 2-fold rotational symmetry around the centre of each elongated support groove as seen in the side view of FIG. 2 so that the lower and upper side support surfaces 9a, 9b exhibit the same shape/size/orientation when the double-sided round cutting insert is reversed/turned upside-down.

Moreover, as can be seen in FIG. 3, the circumferential side surface 4 comprises upper and lower clearance surfaces 4a, 4a' adjacent to the upper and lower cutting edges 6, 6', wherein the upper and lower clearance surfaces 4a, 4a' form a positive clearance angle α at the upper and lower cutting edges 6, 6'. The positive clearance angles at the upper and lower cutting edges 6, 6' is identical on the double-sided cutting insert and may be in the range 3°≤α≤7°.

FIG. 4 discloses a cross-section at the neutral plane NP of the double-sided round cutting insert 1 and shows eight identical elongated support grooves 7 being evenly distributed around the circumference of the double-sided round cutting insert. Accordingly, adjacent elongated support grooves 7 are spaced at an angle γ of 45° with the insert centre axis $C_1$. Hence, the double-sided round cutting insert 1 with eight elongated support grooves 7 has eight index positions on each of the upper and lower sides 2, 3 (or sixteen index positions in total). Although any desired number of elongated support grooves 7 (index positions) can be arranged around the circumference of the round cutting insert, the inventions is beneficially realized using many or at least six elongated support grooves 7, since basic idea of the invention is that of enabling a relatively large number of index positions provided by relatively large sized side support surfaces 9a, 9b that can be arranged closely together. Hence, as can be seen also in FIGS. 1-2, the identical elongated support grooves 7 are arranged in a side-by-side manner around the entire circumferential side surface 4, which includes small transition (curved) surfaces arranged between adjacent elongated support grooves 7.

Figures 5A, 5B, 5C:
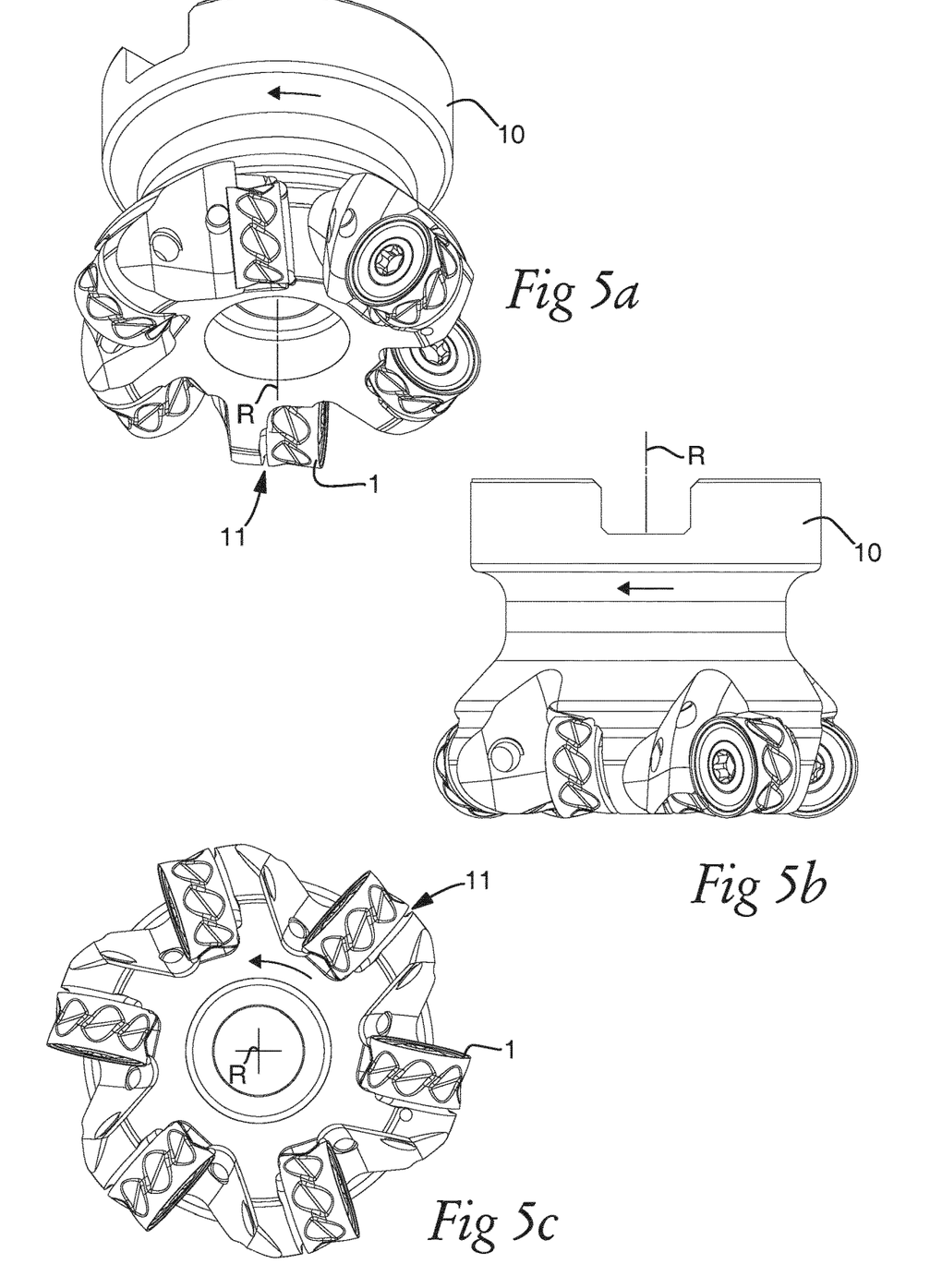

FIGS. 5a-5c discloses different views of a milling tool according to an embodiment of the invention. The milling tool comprises a tool body 10 being rotatable around a central rotation axis R in the direction of an arrow shown in the figures. Hence, it is a right hand milling tool. The milling tool body 10 includes several seats 11 configured for the round cutting insert as described above.

Figure 6:
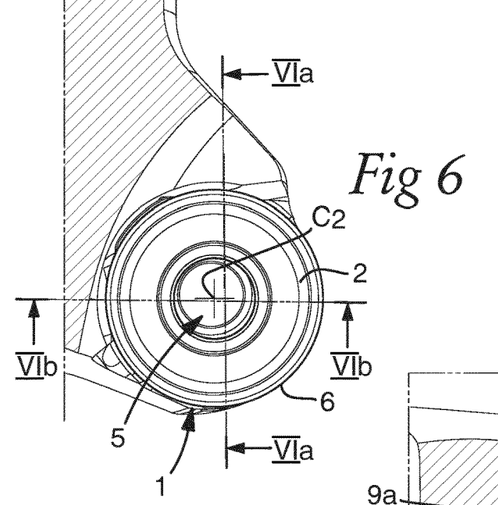
FIGS. 6-6*b* show a detailed view of the milling tool including the round cutting insert mounted in the seat and two cross-sections VIa-VIa and VIb-VIb in parallel with a seat centre axis.
Figure 6A:
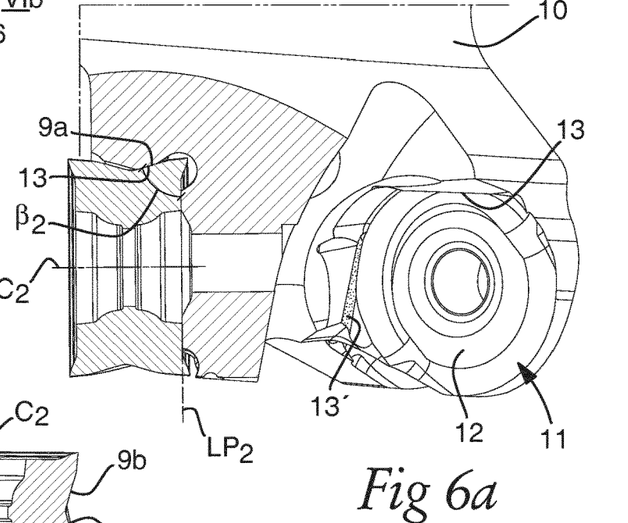
Figure 6B:
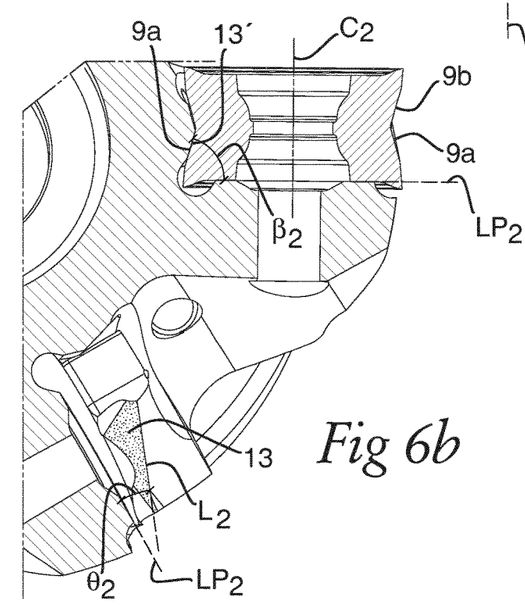
Figure 7:
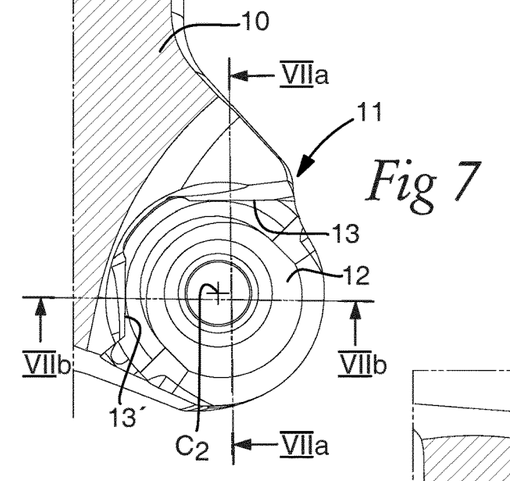
FIGS. 7-7*b* show a detailed view of the seat of the milling tool body (without the round cutting insert) and two cross-sections VIIa-VIIa and VIIb-VIIb in parallel with a seat centre axis.
Figure 7A:
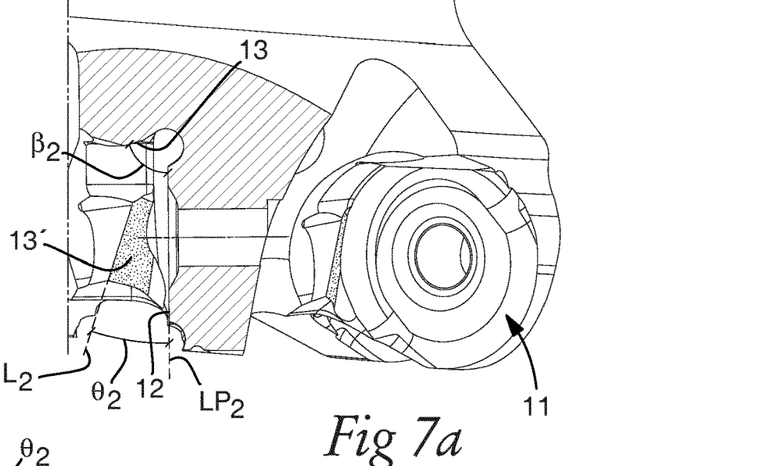
Figure 7B:
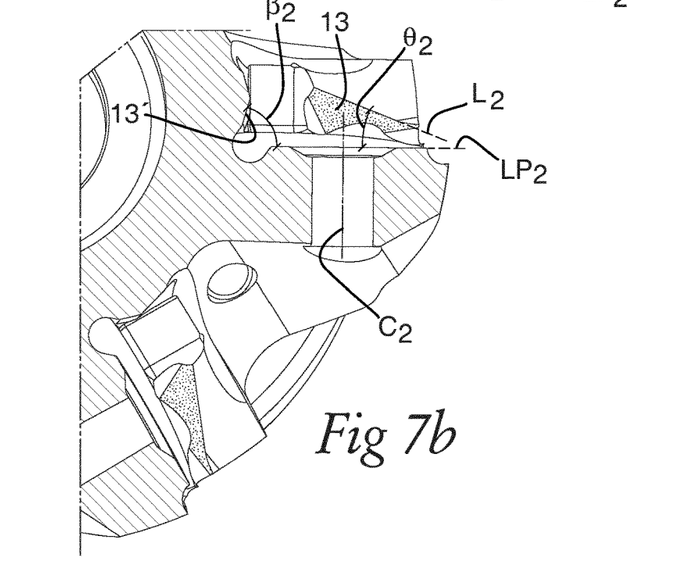

The seat 11 is shown in more detail in FIGS. 6 and 6a-6b as well as FIGS. 7 and 7a-7b. As can be seen, the seat comprises a seat centre axis $C_2$ and a round bottom contact surface 12 for supporting the lower round main surface 3 of the round cutting insert 1. The round bottom contact surface 12 is defining a lower reference plane $LP_2$ extending perpendicularly to the seat centre axis $C_2$. The seat centre axis $C_2$ is disposed at the centre of the round bottom contact surface 12 and is defining the centre of a screw hole for mounting the round cutting insert 1 in the seat 11. The seat 11 further comprises a side contact surface 13 for supporting the side support surface 9a of the round cutting insert 1, wherein the side contact surface 13 is extending in a lengthwise direction $L_2$ to form a corresponding acute angle $\theta_2$ with the lower reference plane $LP_2$ as seen in a side view of the seat 11 (see FIGS. 6b and 7b). Additionally, the side contact surface 13 is forming a corresponding acute inner angle $\beta_2$ with the lower reference plane $LP_2$ of the seat 13 as seen in cross-sections parallel with the seat centre axis $C_2$ (see FIGS. 6a and 7a). In this embodiment, each seat 11 comprises two side contact surfaces 13, 13' for supporting two lower side support surfaces 9a of two elongated support grooves 7 on the round cutting insert. A first side contact surface 13 is arranged as an axial support surface and a second contact surface 13' is arranged as a radial support surface in each seat 11 of the milling tool body 10. The second (radial) contact surface 13' is also extending in a lengthwise direction $L_2$ to form a corresponding acute angle $\theta_2$ with the lower reference plane $LP_2$ as seen in a side view of the seat 11 (see FIG. 7a).

Figures 8, 8A, 8B, 8C:
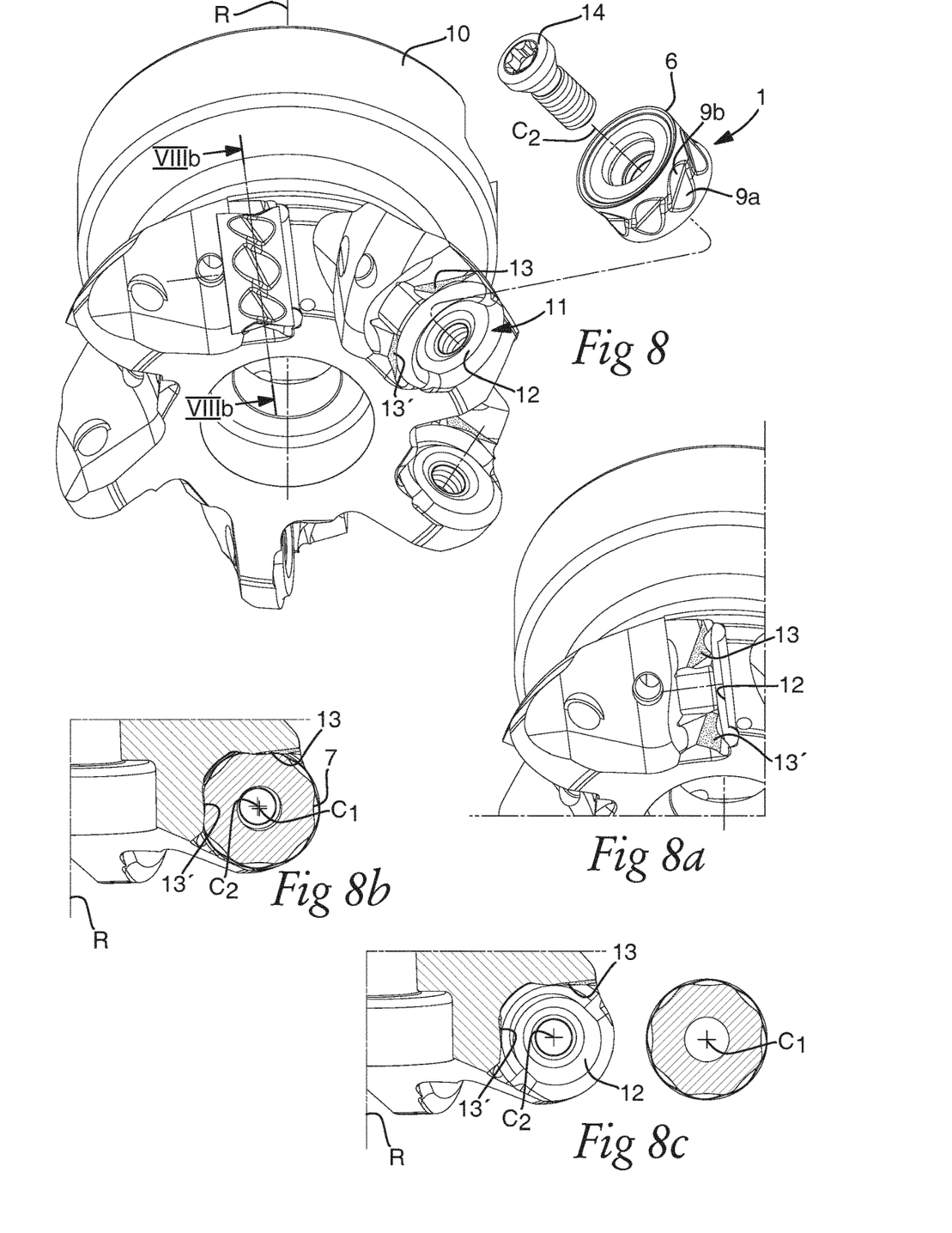

FIGS. 8-8c show further views of the milling tool body 10 with the round cutting insert 1 mounted in the seat 11 be means of a screw 14. FIG. 8b discloses a cross-section taken along section VIIIb-VIIIb (the neutral plane NP) in FIG. 8 of the round cutting insert. As can be seen in FIG. 8b the seat centre axis $C_2$ defining the centre of the screw hole for fastening the cutting insert is disposed axially and radially closer to the side contact surfaces 13, 13' in relation to the insert centre axis $C_1$ defining the centre of the through-hole 5 of the round cutting insert 1, whereby the screw 14 provides an eccentric spring bias via the inherent elasticity of the screw 14 that presses the side contact surfaces 9a into tight abutment with the axial and radial contact surfaces 13, 13' when the round cutting insert 1 is mounted in the seat 11. As can also be seen the axial and radial contact surfaces 13, 13' are spaced apart so that one elongated support groove 7 is disposed in between the axial and radial contact surfaces 13, 13' of the seat 11. Hence, the axial and radial contact surfaces 13, 13' are hereby spaced apart at an angle of 90° with the seat centre axis $C_2$, whereas the eight elongated support grooves 7 spaced at an angle γ of 45° with the insert centre axis $C_1$. Furthermore, as can be seen in FIGS. 8b-8c, the lengthwise extension of the axial contact surface 13 is essentially perpendicular to the central rotation axis R and the lengthwise extension of the radial contact surface 13' is essentially parallel with the central rotation axis R as seen in a top view of the seat 11. Accordingly, the axial contact surface 13 provides support against axial cutting forces, whereas the radial contact surface 13' provides support against radial cutting forces. In this case the double-sided round cutting insert is eight times indexable on each of the upper and lower sides, yet the round cutting insert may obviously also be indexed four times if the desired cutting depth is equal to the radius of the round cutting insert.

The invention is of course not limited to the embodiments disclosed but may be varied and modified within the scope of the appended claims. The shown embodiments discloses a round cutting insert and milling tool body for a right-hand milling tool (right-hand rotation), but the round cutting insert and milling tool body may be designed for a left-hand milling tool (left-hand rotation), wherein the seat 11 is basically mirror-symmetric with the rotational axis R of the shown right-hand milling tool body and the lengthwise direction L of the elongated support grooves 7 are inclined in the opposite (negative) direction −θ in relation to the neutral plane NP. Although the embodiment is a double-sided round cutting insert, the invention may also be used on a single-sided round cutting insert.

The invention claimed is:

1. A round cutting insert for a milling tool, the round cutting insert having an insert centre axis and a neutral plane extending perpendicularly to the insert centre axis, the round cutting insert comprising:
   an upper round main surface defining an upper reference plane and a lower round main surface defining a lower reference plane, which are equidistantly separated from the neutral plane;
   a circumferential side surface surrounding the insert centre axis and extending between the upper and lower round main surfaces;
   an upper cutting edge formed along the intersection of the upper round main surface and the circumferential side surface; and
   a plurality of elongated support grooves arranged in the circumferential side surface, wherein each elongated support groove has a bottom surface extending in a lengthwise direction with opposite flank surfaces converging toward the bottom surface and extending in parallel with the lengthwise direction of the elongated support groove, the lengthwise direction of each elongated support groove forming an acute angle with the neutral plane as seen in a side view of the round cutting insert, and at least one of the opposite flank surfaces of each elongated support groove being configured as a side support surface for the round cutting insert.

2. The round cutting insert according to claim 1, wherein a lower flank surface, in relation to the upper reference plane, is configured as the side support surface in each elongated support groove.

3. The round cutting insert according to claim 2, wherein the lengthwise direction forms a positive acute angle with the neutral plane as seen in a side view of a round cutting insert configured for a right hand milling tool, or wherein the lengthwise direction forms a negative acute angle with the neutral plane as seen in a side view of a round cutting insert configured for a left hand milling tool.

4. The round cutting insert according to claim 1, wherein the acute angle has an absolute value in the range $10° \leq \theta \leq 45°$.

5. The round cutting insert according to according to claim 1, wherein the side support surface is planar.

6. The round cutting insert according to claim 2, wherein the lower flank surface configured as the side support surface forms an acute inner angle with the lower reference plane as seen in cross-sections parallel with the insert centre axis.

7. The round cutting insert according to claim 6, wherein the lower flank surface configured as the side support surface forms an acute inner angle in the range $65°≤β≤85°$, with the lower reference plane as seen in cross-sections parallel with the insert centre axis.

8. The round cutting insert according to claim 1, wherein the round cutting insert is a double-sided cutting insert including a lower cutting edge formed along the intersection of the lower round main surface and the circumferential side surface, wherein the opposite flank surfaces of each elongated support groove form identical side support surfaces.

9. The round cutting insert according to claim 8, wherein each elongated support groove is v-shaped as seen in a cross-section parallel with the insert centre axis.

10. The round cutting insert according to claim 8, wherein the circumferential side surface includes upper and lower clearance surfaces adjacent to the upper and lower cutting edges, wherein the upper and lower clearance surfaces form positive clearance angles at the upper and lower cutting edges.

11. The round indexable cutting insert according to claim 1, wherein identical elongated support grooves are arranged in a side-by-side manner around the entire circumferential side surface and a number of elongated support grooves is at least six or greater, such as eight elongated support grooves being arranged in the side-by-side manner around the entire circumferential side surface.

12. A milling tool body being rotatable around a central rotation axis and including a seat configured for the round cutting insert according to claim 1, wherein the seat includes a seat centre axis and a round bottom contact surface for supporting the lower round main surface of the round cutting insert, the round bottom contact surface defining a lower reference plane extending perpendicularly to the seat centre axis, wherein the seat further includes at least one side contact surface for supporting the side support surface of the round cutting insert, wherein the side contact surface extends in a lengthwise direction to form a corresponding acute angle with the lower reference plane as seen in a side view of the seat.

13. The milling tool body according to claim 12, wherein the side contact surface forms a further corresponding acute inner angle with the lower reference plane of the seat as seen in cross-sections parallel with the seat centre axis.

14. The milling tool body according to claim 12, wherein the seat includes two side contact surfaces for supporting two side support surfaces of two elongated support grooves on the round cutting insert, wherein a first side contact surface is arranged as an axial support surface and a second contact surface is arranged as a radial support surface in the seat of the milling tool body.

15. A milling tool comprising:
a milling tool body according to claim 12; and
a round cutting insert according to claim 1.

* * * * *